(12) United States Patent
Leclerc et al.

(10) Patent No.: US 6,833,432 B2
(45) Date of Patent: Dec. 21, 2004

(54) CONJUGATED POLY(2,7-CARBAZOLE) DERIVATIVES AND PROCESS FOR THE PREPARATION THEREOF

(75) Inventors: Mario Leclerc, Ancieene-Lorette (CA); Jean-Francois Morin, Sainte-Foy (CA)

(73) Assignee: Universite Laval, Quebec (CA)

(*) Notice: Subject to any disclaimer, the term of this patent is extended or adjusted under 35 U.S.C. 154(b) by 0 days.

(21) Appl. No.: 10/241,719

(22) Filed: Sep. 12, 2002

(65) Prior Publication Data

US 2003/0092880 A1 May 15, 2003

Related U.S. Application Data

(63) Continuation-in-part of application No. 10/003,774, filed on Oct. 31, 2001, now abandoned.

(51) Int. Cl.[7] .................... C08G 73/00; C08G 73/56
(52) U.S. Cl. .................... 528/422; 528/423; 528/398; 528/391; 528/487
(58) Field of Search ............................ 528/422, 423, 528/398, 391, 487

(56) References Cited

PUBLICATIONS

D.J. Sandman, Trends in Polymer Science (TRIP), 1994, vol. 2, No. 2, pp. 44–55.

Peter A.S. Smith et al., "The Reaction of Aryl Azides with Hydrogen Halides", presented at the National Meeting of the American Chemical Society, San Francisco, Mar. 1949.

B.R. Hsieh et al., Macromolecules, 1985, vol. 18, pp. 1388–1394.

T. Yamamoto et al., Macromolecules, 1992, vol. 25, pp. 1214–1223.

M. Ranger et al., Macromolecules, 1997, vol. 30, pp. 7688–7691.

(List continued on next page.)

*Primary Examiner*—Duc Truong
(74) *Attorney, Agent, or Firm*—Sidley Austin Brown & Wood LLP (57) ABSTRACT

The invention relates to conjugated poly(2,7-carbazole) derivatives comprising repeating, alternating or random units of the formula:

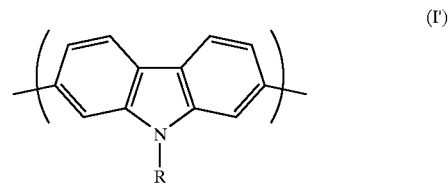

(I')

wherein R represents a linear or branched alkyl group having 1 to 22 carbon Aatoms. The conjugated poly(2,7-carbazole) derivatives according to the invention have interesting optical and electrochemical properties which render them suitable for use in the manufacture of diverse electrical, optical and electro-optical devices.

6 Claims, 2 Drawing Sheets

OTHER PUBLICATIONS

M. Murata et al., J. Org. Chem., 2000, vol. 65, pp. 164–168.

J.F. Morin et al., Macromolecules, 2001, vol. 34, pp. 4680–4682.

M. Leclerc, Journal of Polymer Science: Part A: Polymer Chemistry, 2001, vol. 39, pp. 2867–2873.

Geissler et al. "Polyarylenes on the Basis of Alkylpyrrole and Alkycarbazole Derivatives and their Oligomeric Model Systems." Polymers for Advanced Technologies, vol. 8, pp. 87–92.

Schenk et al. "Novel Oligo(phenylenevinylenes): Models for the Charging of Extended π Chains." J. Am. Chem. Soc. 1991, vol. 113, pp. 2634–2647.

Geissler et al. "Polyarylenes on the Basis of Alkylpryrrole and Alkylcarbazole Derivatives and their Oligomeric model Systems". Abstract 126:212647.

Siove et al. "Thermal Transistions in Poly (N–alkyl–3, 6–carbazolylenes)." Abstract 119:250891.

Faid et al. "Investigation of the Electrocatalyzed Step Polymerization of Soluble Electroactive Poly (N–alkyl–3,6–carbazolylenes)." Abstract 119:181323.

Siove et al. "Chain Length Effect on the Electroactivity of Poly (N–alkyl–3,6–carbazolediyl) Thin Films." Abstract 114:31798.

Matsura et al. "Polymers of Carbazole Derivatives." Abstract 111: 40172.

Meng et al. "Synthesis and Electrochemical Characterization of a New Polymer Constituted of Alternating Carbazole and Oxadiazole Moieties." Abstract 131:88268.

CONJUGATED POLY(2,7-CARBAZOLE) DERIVATIVES AND PROCESS FOR THE PREPARATION THEREOF

CROSS-REFERENCE TO RELATED APPLICATION

This application is a continuation-in-part of U.S. patent application Ser. No. 10/003,774, filed Oct. 31, 2001 now abandoned.

BACKGROUND OF THE INVENTION

The present invention pertains to improvements in the field of conjugated polymers. More particularly, the invention relates to conjugated poly(2,7-carbazole) derivatives and to a process for the preparation thereof.

A conjugated polymer is a polymer which possesses a delocalized pi-electron system along its backbone as described, for example, by D. J. Sandman in "Trends in Polymer Science", Vol. 2, p. 44 (1994). Conjugated polymers are considered as a very important class of electroactive and photoactive materials by both academic and industrial laboratories. The synthesis over the last twenty years of highly pure polyacetylene, polythiophenes, polyphenylenes, polyfluorenes, ladder polymers and other conjugated polymers with optimized physical properties has led to a significant improvement in the performance of these polymeric materials and to a better understanding of their structure-property relationships. However, up to now, only poorly conjugated poly(N-alkyl-3,6-carbazole) derivatives are available so that these are not optimized for the development of light-emitting diodes, electrochromic windows, electrochemical sensors, photovoltaic cells, photoconductors, photorefractive materials, transistors, etc.

SUMMARY OF THE INVENTION

It is therefore an object of the present invention to provide conjugated poly(2,7-carbazole) derivatives having improved optical and electrochemical properties.

According to one aspect of the invention, there is provided a conjugated poly(N-alkyl-2,7-carbazole) of formula (I):

wherein R represents a linear or branched alkyl group having 1 to 22 carbon atoms, and n is an integer of about 3 to about 100.

The present invention also provides, in another aspect thereof, a process for preparing a conjugated poly(N-alkyl-2,7-carbazole) of the formula (I) defined above, which comprises treating a N-alkyl-2,7-difunctionnalized carbazole of formula (II):

wherein R is as defined above and X represents a trifluoromethanesulfonyl group or a halogen atom selected from the group consisting of bromine, chlorine and iodine atoms, with triphenylphosphine and 2,2'-bipyridine in the presence of zinc and nickel chloride, to cause polymerization of the compound of formula (II). A According to a further aspect of the invention, there is provided a conjugated polymer comprising alternating or random units of formula (I'):

wherein R is as defined above.

The polymers comprising alternating units of formula (I') can be obtained by Suzuki on Stille couplings. The polymers comprising random units of formula (I'), on the other hand, can be obtained by Yamamato-couplings.

The conjugated poly(2,7-carbazole) derivatives according to the invention, comprising repeating, alternating or random units of formula (I'), have interesting optical and electrochemical properties which render them suitable for use in the manufacture of light-emitting diodes, electrochromic windows, electrochemical sensors, photovoltaic cells, photoconductors, photorefractive materials and the like.

EXAMPLES

Example 1

Preparation of poly(N-octyl-2,7-carbazole)

Following the procedure developed by Smith and Brown and reported in J. Am. Chem. Soc., Vol. 73, p. 2438 (1951), 4,4'-dinitro-2-biphenylamine (Aldrich Co.) was treated with NaNO$_2$ and NaN$_3$ to give the corresponding azide via the transformation of the amino group into a diazonium salt. A ring closure reaction, assured by a nitrene intermediate, was carried out to give 2,7-dinitrocarbazole in a 66% yield. This compound was then reduced using SnCl$_2$ in a mixture of acetic acid/HCl (5:1) to give 2,7-diaminocarbazole in a 78% yield. Then, the amino groups of the resulting product were transformed to iodine atoms; the reaction was carried out in a 3M HCl solution using $NaNO_2$ and KI. N-octyl-2,7-diiodocarbazole was prepared in a 93% yield from 2,7-diiodocarbazole upon reaction with $K_2CO_3$ and 1-bromooctane in anhydrous DMF at 80° C. All monomers were characterized by NMR and mass spectrometry. Homopolymerization was achieved by a Yamamoto reaction described in Macromolecules, Vol. 25, p. 1214 (1992), using N-octyl-2,7-diiodocarbazole as the starting material and triphenylphosphine, 2,2'-bipyridine, and zinc and $NiCl_2$ as catalysts. Poly(N-octyl-2,7-carbazole) was obtained in a 78% yield. The synthetic scheme is summarized as follows:

It is also possible to use, instead of N-alkyl-2,7-diiodocarbazole, N-alkyl-2,7-dichlorocarbazole which can be obtained from a different synthetic pathway, according to the following scheme:

This scheme involves a coupling between 4-chlorophenylboronic acid (Aldrich Co.) and 1-bromo-4-chloro-nitrobenzene (Aldrich Co.), followed by a ring closure using P(OEt)$_3$ and an alkylation of the nitrogen atom in DMF and K$_2$CO$_3$ using octylbromide or 1-bromooctadecane.

Example 2

Preparation of poly(N-octyl-2,7-carbazole-alt-9,9-dioctyl-2,7-fluorene) and poly[N-(2-ethylhexyl)-2,7-carbazole-alt-5,5'-(2,2'-bithiophene)]

Alternating copolymers were prepared from Suzuki couplings (described by Ranger, M. et al. in Macromolecules, Vol. 30, p. 768 (1997)) between di-boronic functionalized aromatic units and N-alkyl-2,7-diiodocarbazole derivatives. Poly(N-octyl-2,7-carbazole-alt-9,9-dioctyl-2,7-fluorene) was prepared from a reaction between 2,7-bis(4,4,5,5-tetramethyl-1,3,2-dioxaborolan-2yl)-9,9-dioctylfluorene and N-octyl-2,7-diiodocarbazole using (PPh$_3$)$_4$Pd(0) as catalyst in a mixture of THF and 2 M K$_2$CO$_3$ aqueous solution. Moreover, Stille couplings (described by Yu, L. et al. in Acc. Chem. Res., Vol. 29, p. 13 (1996)) between distannyl aromatic derivatives and N-alkyl-2,7-diiodocarbazole derivatives are possible. As an example, poly[N-(2-ethylhexyl)-2,7-carbazole-alt-5,5'-(2,2'-bithiophene)] was obtained with a good yield from N-(2-ethylhexyl)-2,7-diiodocarbazole and of 5,5'-bis(trimethylstannyl)-2,2'-bithiophene, in presence of Cl$_2$(PPh$_3$)$_2$Pd(0) in THF . These polymerization reactions are summarized in the following scheme:

Example 3

Preparation of poly (N-octyl-2,7-carbazole)

In order to obtain a reactive monomer in better global yield than obtained with 2,7-diiodocarbazole derivatives, N-octyl-2,7-(bis(trifluoromethanesulfonyl)-carbazole was synthesized as follows:

Cadogan ring closure reaction was carried out in hot triethylphosphite to give 2,7-dimethoxycarbazole (12) as reported in Macromolecules, Vol. 18, p. 1388 (1985). This compound was alkylated using finely powdered NaOH, phase transfer agent and primary alkyl bromide in anhydrous acetone. From compound (13), a standard deprotection reaction using BBr$_3$ in methylene chloride was achieved to give 2,7-dihydroxycarbazole (14), in relatively good yields. Finally, The biphenyl unit (11) was obtained using a Suzuki coupling between 4-methoxyphenylboronic acid and 4-bromo-3-nitroanisole in standard conditions. Then, a monomer (14) was treated with DMAP and trifluoromethanesulfonic anhydride in cold pyridine to give monomers (15) that can undergo Yamamoto, Stille or Suzuki polycondensation reaction. When necessary, boronic esters can be introduced at the 2,7-positions with pinacolborane and Pd(II) using similar procedure published in J. Org. Chem., Vol. 65, p. 164 (2000) to obtain compound (16) to perform Suzuki polycondensation reaction.

Example 4

Preparation of Poly(N-(2-ethylhexyl)-2,7-carbazole-co-9,9-dioctyl-2,7-fluorene)

Poly(N-(2-ethylhexyl)-2,7-carbazole-co-9,9-dioctyl-2,7-fluorene) was prepared by random copolymerization of a 50:50 mixture of N-(2-ethylhexyl)-2,7-dichlorocarbazole (9) and 9,9-dioetyl-2,7-dichlorofluorene (17). Compound 17 was obtained by refluxing 9,9-dioctylfluorene in a solution of chlorobenzene over $CuCl_2$ adsorbed on alumina. The random copolymerisation reaction was carried out in a 100 mL flask in which were added Bis(1,5-cyclooctadiene) nickel(0) ($Ni(COD)_2$) (1.04 g, 3.79 mmol). 2,2'-dipyridyl (0.59 g, 3.79 mmol). 1,5-cyclooctadiene (COD) (0.34 g, 3.16 mmol) and well degassed anhydrous DMF (30 mL). The mixture was stirred under argon for 30 min. at 60° C. Separately, N-(2-ethylhexyl)-2,7-dichlorocarbazole (9) (0.55 g, 1.58 mmol) and 9,9-dioctyl-2,7-dichlorofluorene (17) (0.73 g, 1.58 mmol) were dissolved in well degassed anhydrous DMF (7 mL). These solutions were rapidly added to the catalytic solution and the resulting mixture was stirred under argon for 72 h at 60° C. The whole mixture was then poured into a cold mixture of methanol/hydrochloric acid (5:1). The precipitated material was recovered by filtration through a Büchner funnel and washed with diluted hydrochloric acid. The solid material was washed for 24 h in a Soxhlet apparatus using acetone to remove oligomers and catalyst residues. The resulting solid was dissolved in chloroform and filtrated on 0.2 μm filtering paper to remove maximum suspended impurities. The resulting yellow solid was dried under reduced pressure for 24 h. (Yield: 71%). NMR analyses have revealed a composition which corresponds to the initial ratio between co-monomers (50:50).

The random copolymerisation reaction is summarized in the following scheme, where x and y in the final reaction product may independently have a different value in each occurrence.

Materials. All chemicals were purchased from Aldrich Co. and were used without further purification.

4,4'-dinitro-2-azidobiphenyl (2): To a solution of 10.0 g (38.6 mmol) of 4,4'-dinitro-2-biphenylamine in a mixture of 200 mL of acetic acid and 40 mL of sulfuric acid at 0° C. was added dropwise 5.32 g (77.2 mmol, Aldrich Co.) of sodium nitrite. The mixture was stirred at 5–10° C. for 2 h after 5.00 g of urea (to destroy the excess nitrous acid), 500 mL of ice-water and 5 g of activated carbon was added. The cold suspension was stirred again for 20 min and filtrated rapidly through a Büchner funnel into a flask immersed in an ice bath. A solution of 5.07 g (77.2 mmol, Aldrich Co.) of sodium azide in 100 mL of water was added dropwise to the yellow clear filtrate. The resulting solution was stirred at 0° C. for 1 h and at room temperature for 24 h. The mixture was quenched with 500 mL of a solution of $NaHCO_3$ in water and extracted three times with ethyl acetate. The organic layer was dried over magnesium sulfate and the solvent was removed under vacuum. Recristallization in ethanol afforded 7.37 g of the title product as a yellow solid. M.P. 171–172° C. (Yield: 72%).

$^1$H NMR (300 MHz, $CDCl_3$, ppm): 8.37 (d, 2H, J=8.8 Hz); 8.20 (d, 1H, J=2.2 Hz); 8.16 (dd, 1H, J=10.3 and 2.2 Hz); 7.89 (dd, 2H, J=8.8 and 2.8 Hz); 7.79 (d, 1H, J=8.1 Hz).

$^{13}$C NMR (75 MHz, $CDCl_3$, ppm): 143.84; 140.35; 137.98; 133.20; 131.81; 124.29; 120.71; 115.44.

HRMS: Calculated for $C_{12}H_7N_5O_4$: 285.0498 Found: 285.0505

2,7-dinitrocarbazole (3): To 600 mL of boiling kerosene (first washed with concentrated sulfuric acid) was added very slowly 6.00 g (21.0 mmol) of compound 2. The solution was maintained to reflux for 1 h. After cooling, the solution was kept at 4° C. for 24 h. The precipitate was filtered through a Büchner funnel and the solid was washed with petroleum ether. Very pure material was obtained by recristallization in ethanol to afforded 3.38 g of the title product. M.P. >300° C. (Yield: 66%).

$^1$H NMR (300 MHz, Acetone-$d_6$, ppm): 11.41 (s, 1H); 8.55 (d, 2H, J=2.2 Hz); 8.49 (d, 2H, J=8.8 Hz); 8.15 (dd, 2H, J=8.8 and 2.2 Hz).

$^{13}$C NMR (75 MHz, Acetone-$d_6$, ppm): 141.07; 126.38; 122.09; 114.76.

HRMS: Calculated for $C_{12}H_7N_3O_4$: 257.0436 Found: 257.0431

2,7-diaminocarbazole (4). To a solution of compound 3 (6.00 g, 23.3 mmol) in a mixture of acetic acid (200 mL) and hydrochloric acid (35 mL) was added 44.3 g (0.024 mol, Aldrich Co.) of tin(II) chloride. The mixture was refluxed for 24 h under argon. After cooling, the precipitate was separated from the solvent by filtration and washed several times with cold acetic acid. The resulting diammonium salt was dissolved in water followed by addition of an aqueous solution of sodium hydroxide until the pH was around 10. The precipitate was collect by filtration and dried under vacuum. Recristallization in ethanol afforded 3.60 g of the title product as a shiny gray solid. M.P. 248° C. (dec.). (Yield: 78%).

$^1$H NMR (300 MHz, Acetone-$d_6$, ppm): 9.45(s, 1H); 7.53(d, 2H, J=8.1 Hz); 6.62 (d, 2H, J=1.5 Hz); 6.47 (dd, 2H, J=17.0 and 2.2 Hz); 4.45 (s, 4H).

$^{13}$C NMR (75 MHz, Acetone-$d_6$, ppm): 146.53; 142.53; 119.72; 116.58; 108.70; 96.42.

HRMS: Calculated for $C_{12}H_{11}N_3$: 197.0953 Found: 197.0948

2,7-diiodocarbazole (5). To a solution of 1.50 g (7.56 mmol) of compound 4 in 100 mL of 3 M HCl solution at 0°

C. was added very slowly 1.10 g (15.9 mmol) of sodium nitrite in 5 mL of water. The mixture was stirred at 0° C. for 2 h and then added to 100 mL of a solution of potassium iodide in distilled water. The stirring was kept for 24 h at room temperature. The precipitate was collect by filtration and washed with aqueous solution of $NaHCO_3$. The solid was dried under vacuum for 24 h and use directly in the next reaction without further purification. However, the crude material could have been purified by column chromatography (silica gel, 10% ethyl acetate in hexanes as eluent) but the reaction yield would be greatly affected, probably due to the degradation of the product on silica gel.

$^1$H NMR (300 MHz, Acetone-$d_6$, ppm): 10.54(s, 1H); 7.93 (m, 4H); 7.53 (dd, 2H, J=7.4 and 1.5 Hz).

$^{13}$C NMR (75 MHz, Acetone-$d_6$, ppm): 141.77; 128.88; 122.69; 120.79; 120.74; 90.89.

HRMS: Calculated for $C_{12}H_7I_2N$: 418.8668 Found: 418.8675

N-octyl-2,7-diiodocarbazole (6). To a solution of compound 5 (3.00 g) in 30 mL of anhydrous DMF was added 660 mg (4.78 mmol, Aldrich Co.) of anhydrous $K_2CO_3$. The solution was stirred at 80° C. for 2 h under argon after 0.93 g (4.82 mmol) of bromooctane was added. The mixture was stirred at 80° C. for 24 h and then quenched with 30 mL of water. The aqueous layer was extracted three times with 50 mL of diethyl ether. The organic layer was dried over magnesium sulfate and the solvent was removed under vacuum. The residue was purified by column chromatography (silica gel, hexanes as eluent) followed by recristallization in methanol to give 1.55 g of the title product as a white solid. M.P. 82–84° C. (Global yield for the last two steps: 38%).

$^1$H NMR (300 MHz, $CDCl_3$, ppm): 7.78 (d, 2H, J=8.1 Hz); 7.73 (s, 1H); 7.52 (dd, 2H, J=8.8 and 1.5 Hz); 4.17 (t, 2H, J=7.4 Hz); 1.82 (m, 2H); 1.30 (m, 10H); 0.88 (t, 3H, J=5.9 Hz).

$^{13}$C NMR (75 MHz, $CDCl_3$, ppm): 141.25; 128.20; 121.84; 121.81; 117.96; 90.80; 43.25; 31.81; 29.28; 29.17; 28.80; 27.15; 22.64; 14.11.

HRMS: Calculated for $C_{20}H_{23}I_2N$: 530.9920 Found: 530.9906

1-chloro-4-(4'-chlorobenzene)-2-nitrobenzene (7): In a 100 mL flask, 4-chlorophenylboronic acid (2.00 g, 12.8 mmol, Aldrich Co.), 1-bromo-4-chloro-2-nitrobenzene (2.72 g, 11.5 mmol, Aldrich Co.), 18 mL of benzene and 12 mL of aqueous $K_2CO_3$ 2M were mixed. The resulting solution was degassed with a vigorous flow of argon. Tetrakis (triphenylphosphine)Pd(0) (0.5–1.0 mol %) was then added under argon and the mixture was refluxed for 2 h. The mixture was filtered through a Büchner funnel and the filtrate was extracted three times with diethyl ether. The combine organic layer was washed with brine and dried over magnesium sulfate. The solvent was removed and the residue was purified by column chromatography (silica gel, hexanes as eluent) to provide 2.87 g of the title product as a yellow solid. M.P. 88–89° C. (Yield: 93%).

$^1$H NMR (300 MHz, Acetone-$d_6$, ppm): 8.06 (d, 1H, J=2.2 Hz); 7.82 (dd, 1H, J=5.9 and 2.2 Hz); 7.61 (d, 1H, J=8.8 Hz); 7.52 (dd, 2H, J=8.8 and 2.2 Hz); 7.40 (dd, 2H, J=8.1 and 2.2 Hz).

$^{13}$C NMR (75 MHz, Acetone-$d_6$, ppm): 136.08; 134.97; 134.67; 134.15; 133.43; 130.43 (2C); 129.61; 124.88 (2C).

2,7-dichlorocarbazole (8): A 25 mL flask was charged with 2.00 g of compound 2 and 10 mL of triethylphosphite. The resulting mixture was refluxed under argon for 5 h. The excess of triethylphosphite was distillated under vacuum (30° C., 0.25 mm Hg) and the crude product was purified by column chromatography (silica gel, 10% ethyl acetate in hexanes) to provide 1.05 g of the title product as a white solid. M.P. 188–189° C. (Yield: 60%).

$^1$H NMR (300 MHz, $CDCl_3$, ppm): 8.02 (s, 2H); 7.91 (d, 2H, J=8.1 Hz); 7.38 (d, 2H, J=1.5 Hz); 7.22 (dd, 2H, J=8.8 and 1.5 Hz).

$^{13}$C NMR (75 MHz, $CDCl_3$, ppm): 140.18; 131.86; 121.43; 121.10; 120.62; 110.87.

N-((2-ethylhexyl)-2,7-dichlorocarbazole) (9): To a solution of 900 mg compound 8 (3.81 mmol) in 20 mL of anhydrous DMF was added 1.06 g (7.67 mmol, Aldrich Co.) of anhydrous $K_2CO_3$. The solution was stirred at 80° C. for 2 h under argon after 1.47 g (7.61 mmol) of 2-ethylhexylbromide was added. The mixture was stirred at 80° C. for 24 h and then quenched with 30 mL of water. The aqueous layer was extracted three times with 50 mL of diethyl ether. The organic layer was dried over magnesium sulfate and the solvent was removed under vacuum. The residue was purified by column chromatography (silica gel, hexanes as eluent) to give 1.15 g of the title product as a colorless oil (Yield=86%).

$^1$H NMR (300 MHz, $CDCl_3$, ppm): 7.90 (d, 2H, J=8.1 Hz); 7.32 (d, 2H, J=1.5 Hz); 7.19 (dd, 2H, J=8.8 and 2.2 Hz); 4.01 (m, 2H); 2.01 (m, 1H); 1.33 (m, 8H); 0.90 (m, 6H).

$^{13}$C NMR (75 MHz, $CDCl_3$, ppm): 141.74; 131.71; 121.01; 120.89; 119.81; 109.29; 47.64; 39.16; 30.87; 28.64; 24.40; 23.06; 14.03; 10.92.

N-octadecane-2,7-dichlorocarbazole (10): To a solution of 3.00 g of compound 8 (12.7 mmol) in 50 mL of anhydrous acetone was added 3.51 g (25.4 mmol, Aldrich Co.) of $K_2CO_3$ and 8.47 g (25.4 mmol, Aldrich Co.) of 1-bromooctadecane. The solution was refluxed 24 h under argon. The mixture was poured into 100 mL of distilled water and the aqueous layer was extracted with three portions of diethyl ether. The combined organic fractions were washed with brine and dried over magnesium sulfate. The solvent was removed under vacuum. Recristallization from methanol followed by a recristallization in hexanes afforded 4.77 g of the title product as a white solid. M. P. 72–74° C. (Yield=86%).

$^1$H NMR (300 MHz, $CDCl_3$, ppm): 7.90 (d, 2H, J=8.1 Hz); 7.33 (d, 2H, J=1.5 Hz); 7.19 (dd, 2H, J=8.8 and 2.2 Hz); 4.05 (t, 2H, J=7.3 Hz); 1.82 (m, 2H); 1.32 (m, 30H); 0.90 (t, 3H, J=5.9 Hz).

$^{13}$C NMR (75 MHz, $CDCl_3$, ppm): 141.29; 131.75; 121.09; 120.94; 119.83; 109.03; 43.34; 31.97; 29.74 (7C); 29.64; 29.59; 29.51; 29.40; 29.35; 28.76; 27.20; 22.73; 14.15.

1-methoxy-4-(4'-methoxybenzene)-2-nitrobenzene (11): In a 100 mL flask, 4-methoxyphenylboronic acid (4.00 g, 26.3 mmol, Aldrich Co.), 4-bromo-3-nitroanisole (5.50 g, 25.0 mmol, Aldrich Co.), 30 mL of benzene and 20 mL of $K_2CO_3$ 2M in water were mixed. The resulting solution was degassed with a vigorous flow of argon. $Pd(PPh_3)_4$ (0.5–1.0 mol %) was then added under argon and the mixture was refluxed for 2 h. The mixture was filtered through a Büchner funnel and the filtrate was extracted with three portions of diethyl ether. The combined organic fractions were washed with brine and dried over magnesium sulfate. The solvent was removed under reduced pressure and the residue was purified by column chromatography (silica gel, 10% ethyl acetate in hexanes as eluent) to provide 5.50 g of the title product as a yellow solid. M.P. 123–125° C. (Yield: 90%).

¹H NMR (300 MHz, CDCl₃, ppm): 7.32 (m, 2H); 7.21 (d, 2H, J=8.8 Hz); 7.13 (dd, 1H, J=5.9 and 2.2 Hz); 6.94 (d, 2H, J=8.8 Hz); 3.88 (s, 3H); 3.83 (s, 3H).

¹³C NMR (75 MHz, CDCl₃, ppm): 159.41; 158.84; 149.74; 132.80; 129.47; 129.22; 128.22; 118.60; 114.15; 108.96; 55.92; 55.30.

HRMS: Calculated for $C_{14}H_{13}NO_4$: 259.0844 Found: 259.0851

2,7-dimethoxycarbazole (12): A 25 mL flask was charged with 5.30 g (20.4 mmol) of compound 11 and 15 mL of triethylphosphite. The resulting mixture was refluxed under argon for 5 h. After cooling at room temperature, the precipitate was filtrated, washed with a large amount of cold methanol and dried under reduced pressure to provides 3.25 g of the title product as a white solid. M.P. 273–274° C. (Yield: 70%).

¹H NMR (300 MHz, DMSO-d₆, ppm): 10.99 (s, 1H); 7.85 (d, 2H, J=8.5 Hz); 6.95 (d, 2H, J=1.8 Hz); 6.74 (dd, 2H, J=6.3 and 2.0 Hz).

¹³C NMR (75 MHz, DMSO-d₆, ppm): 157.60; 141.08; 119.95; 116.53; 107.34; 94.73; 55.26.

N-octyl-2,7-dimethoxycarbazole (13): A 50 mL flask was charged with 3.00 g (13.2 mmol) of compound 12, 5.10 g (26.4 mmol, Aldrich Co.) of 1-bromooctane, 1.06 g (26.4 mmol) of sodium hydroxide reagent grade, 134 mg (0.39 mmol) of tetrabutylamonium hydrogensulfate (TBAH) and 25 mL of anhydrous acetone. The resulting mixture was refluxed under argon for 24 h and then poured into 100 mL of distilled water. The aqueous layer was extracted three times with diethyl ether. The combined organic fractions were dried over magnesium sulfate and the solvent was removed under reduced pressure. The residue was purified by column chromatography (silica gel, 5% ethyl acetate in hexanes as eluent) to provide 4.06 g of the title product as white fluffy solid. M.P. 63–64° C. (Yield: 91%).

¹H NMR (300 MHz, CDCl₃, ppm): 7.88 (dd, 2H, J=5.9 and 1.5 Hz); 6.84 (m, 4H); 4.17 (t, 2H, J=7.4 Hz); 3.95 (s, 6H); 1.86 (m, 2H); 1.35 (m, 10H); 0.92 (t, 3H, J=4.4 Hz).

¹³C NMR (75 MHz, CDCl₃, ppm): 158.22; 141.98; 120.13; 117.12; 106.65; 93.65; 55.77; 43.07; 31.87; 29.44; 29.23; 28.70; 27.33; 22.67; 14.12.

HRMS: Calculated for $C_{22}H_{29}NO_2$: 339.2198 Found: 339.2193

N-octyl-2,7-hydroxycarbazole (14): A 250 mL flame dried flask was charged with 3.30 g (9.72 mmol) of compound 13 and 100 mL of anhydrous methylene chloride. The solution was cooled at −78° C. and 24.3 mL (48.6 mmol) of boron tribromide (1M in methylene chloride, Aldrich Co.) was added over 0.5 h. The resulting mixture was stirred under argon at −78° C. for 3 h and at room temperature for 12 h. The mixture was quenched slowly with 50 mL of HCl 10% (v/v) to destroy the excess of boron tribromide and extracted with 3 portions of 50 mL methylene chloride. The combined organic fractions were dried over magnesium sulfate and the solvent was removed under reduced pressure. Recrystallization from toluene/hexanes afforded 1.86 g of the title product as a slightly gray solid. M.P. 144–145° C. (Yield: 68%).

¹H NMR (300 MHz, Acetone-d₆, ppm): 8.22 (s, 2H); 7.76 (d, 2H, J=8.8 Hz); 6.88 (d, 2H, J=2.2 Hz); 6.70 (dd, 2H J=6.6 and 2.2 Hz); 4.19 (t, 2H, J=7.4 Hz); 1.82 (m, 2H); 1.31 (m, 10H); 0.86 (t, 3H, J=6.6 Hz).

¹³C NMR (75 MHz, Acetone-d₆, ppm): 156.30; 142.88; 120.37; 117.15; 108.49; 95.78; 43.24; 32.39; 29.85; 29.20; 28.95; 27.24; 23.14; 14.21.

HRMS: Calculated for $C_{20}H_{25}NO_2$: 311.1885 Found: 311.1891

N-octyl-2,7-bis(trifluoromethanesulfonyl)carbazole (15): A 25 mL flask was charged with 2.00 g (6.46 mmol) of compound 14, 790 mg (6.46 mmol, Aldrich Co.) of dimethylaminopyridine (DMAP) and 16 mL of anhydrous pyridine. The mixture was cooled at 0° C. and 5.47 g (19.4 mmol, Aldrich Co.) of trifluoromethanesulfonic anhydride was added dropwise. After 10 min., 4 mL of pyridine was added to dissolve the white precipitate formed during the addition of anhydride. The mixture was stirred at 0° C. for 1 h and at room temperature for 24 h. The excess of anhydride was destroyed with slow addition of 25 mL of distilled water. The mixture was extracted three times with 25 mL of diethyl ether. The combined organic fractions were washed successively with five 50 mL portions of distilled water, five 50 mL portions of aqueous CuSO₄ 0.1M, three 50 mL portions of brine and again with 50 mL portion of distilled water. The mixture was dried over magnesium sulfate and the solvent was removed under reduced pressure. The crude product was purified by column chromatography (silica gel, 5% ethyl acetate in hexanes as eluent) to provide 2.83 g of the title product as a red oil. (Yield: 76%).

¹H NMR (300 MHz, CDCl₃, ppm): 8.00 (d, 2H, J=8.8 Hz); 7.31 (d, 2H, J=2.2 Hz); 7.17 (dd, 2H, J=5.9 and 2.2 Hz); 4.17 (t, 2H, J=7.4 Hz); 1.83 (m, 2H); 1.30 (m, 10H); 0.89 (t, 3H, J=6.6 Hz).

¹³C NMR (75 MHz, CDCl₃, ppm): 148.23; 141.31; 125.34; 121.73; 121.63; 121.09; 116.83; 112.84; 112.58; 102.53; 43.60; 31.68; 29.22; 29.04; 28.68; 27.15; 22.57; 13.90.

HRMS: Calculated for $C_{22}H_{23}F_6NO_6S_2$: 575.0871 Found: 575.0877

N-octyl-2,7-bis(4,4,5,5-tetramethyl-1,3,2-dioxaborolan-2-yl)carbazole (16): A flame dried 25 mL flask was charged successively with 1.50 g (2.60 mmol) of compound 15, 11 mL of 1,2-dichloroethane, 38 mg (0.05 mmol) of $PdCl_2$ (dppf), 2.2 mL of triethylamine and 1.14 mL (7.86 mmol) of 4,4,5,5-tetramethyl-1,3,2-dioxaborolane. The mixture was stirred under argon for 4 h at 80° C. and then poured in 50 mL of distillated water. The aqueous layer was extracted with three portions of CHCl₃. The combined organic layers were dried over magnesium sulfate and the solvent was removed under reduced pressure. The crude dark red oil was purified by column chromatography (NEt₃ pretreated silica gel, 5% ethyl acetate in hexanes) to provide 837 mg of the title product as a white solid. M.P. 168–169° C. (Yield: 59%).

¹H NMR (300 MHz, CDCl₃, ppm): 8.13 (d, 2H, J=7.4 Hz); 7.89 (s, 2H); 7.69 (d, 2H, J=7.4 Hz); 4.39 (t, 2H, J=7.4 Hz); 1.90 (m, 2H); 1.41 (m, 12 H); 1.30 (m, 10H); 0.88 (t, 3H, J=6.6 Hz).

¹³C NMR (75 MHz, CDCl₃, ppm): 140.47; 125.09; 124.86; 120.01; 115.28; 83.80; 42.91; 31.84; 29.37; 29.20; 29.17; 27.12; 24.95; 22.64; 14.11. (The missing peak is due to the carbon linked to the boronic function which shows no signal in ¹³C NMR).

HRMS: Calculated for $C_{32}H_{47}B_2NO_4$: 531.3691 Found: 531.3700

2,7-dichloro-9,9-dioctylfluorene (17): In a 500 mL flask, 9,9-dioctylfluorene (Ranger, M.; Rondeau, D.; Leclerc, M. Macromolecules 1997, 30, 7686.) (5.00 g, 13.1 mmol), CuCl₂ absorbed on alumina (Kodomari, M.; Satoh, H.; Yoshitomi, S. J. Org. Chem. 1988, 53, 2093.) (68.9 g, 170 mmol of CuCl₂) and chlorobenzene (130 mL, Aldrich Co.) was refluxed for 30 h. The product mixture was cooled at room temperature, filtered, and the solid was washed with chlorobenzene. The solvent was removed under reduced pressure and 2,7-dichloro-9,9-dioctylfluorene was isolated by subsequent recristallization in methanol to provide the title product as a white solid.

M.P.: 50–51° C. (Yield: 56%).

$^1$H NMR (δ, 300 MHz, CDCl$_3$): 7.57 (d, 2H, J=8.46 Hz); 7.31 (m, 4H); 1.94 (m, 2H); 1.16 (m, 10H); 0.85 (t, 3H, J=6.69 Hz); 0.61 (m, 2H).

$^{13}$C NMR (δ, 75 MHz, CDCl$_3$): 152.42; 138.67; 133.23; 127.32; 123.30; 120.72; 55.62; 40.22; 31.78; 29.90; 29.84; 29.20; 23.66; 22.61; 14.08.

Example 5

Preparation of poly (N-octyl-2,7-carbazole)

In a 10 mL flask, 1.00 g (1.88 mmol) of compound 6, 296 mg (1.13 mmol) of triphenylphosphine, 405 mg (6.20 mmol) of zinc powder 99.998% 100 mesh, 15.0 mg (0.09 mmol) of 2,2'-bipyridine 12.0 mg (0.09 mmol) of anhydrous nickel (II) chloride and 3 mL of anhydrous DMAc were stirred under argon for 3 days at 100° C. The whole mixture was then poured into a cold mixture of methanol/HCl (5:1 v/v). The precipitated material was recovered by filtration through a Büchner funnel and washed with dilute HCl. The solid material was washed for 24 h in a Soxhlet apparatus using acetone to remove oligomers and catalyst residues. The resulting solid was dilute again in chloroform and filtrated on 0.2 μm filtering paper to remove all traces of nickel. The resulting solid was dried under reduced pressure for 24 h. (Yield: 78%).

Example 6

Preparation of poly (N-octadecane-2,7-carbazole)

In a 25 mL flask, 384 mg (2.46 mmol, Aldrich Co.) of 2,2'-bipyridine, 676 mg (2.46 mmol, Aldrich Co.) of Ni(COD)$_2$ and 0.25 mL (2.05 mmol, Aldrich Co.) of 1,5-cyclooctadiene (COD) 7 mL of degassed anhydrous DMF were stirred under argon for 1 h at 80° C. 1.00 g (2.05 mmol) of compound 10 in 7 mL of degassed anhydrous DMF was added and the mixture was stirred for 48 h under argon at 100° C. The whole mixture was then poured into a cold of methanol. The precipitated material was recovered by filtration through a Büchner funnel. The solid material was washed for 24 h in a Soxhlet apparatus using acetone to remove oligomers and catalyst residues. The resulting solid was dilute again in chloroform and filtrated on 0.2 μm filtering paper to remove all traces of nickel. The resulting solid was dried under reduced pressure for 24 h. (Yield: 75%).

Example 7

Preparation of poly (N-octyl-2,7-carbazole-alt-9,9-dioctyl-2,7-fluorene)

In a 10 mL flask, 225 mg (0.42 mmol) of compound 6, 271 mg (0.42 mmol) of 2,7-Bis(4,4,5,5-tetramethyl-1,3,2-dioxaborolan-2yl)-9,9-dioctylfluorene and 10 mg of (PPh$_3$)$_4$Pd(0) were dissolved in a degassed mixture of THF (2.5 mL) and aqueous 2 M K$_2$CO$_3$. The solution was refluxed under argon for 3 days. The whole mixture was then poured into cold methanol (100 mL). The precipitated material was recovered by filtration through a Büchner funnel and washed with dilute HCl. The solid material was washed for 24 h in a Soxhlet apparatus using acetone to remove oligomers and catalyst residues. The resulting polymers were soluble in THF and CHCl$_3$. (Yield: 78%).

Example 8

Preparation of poly [N-2-ethylhexyl-2,7-carbazole-alt-5,5'-(2,2'-bithiophene)]

In a 50 mL flask, 541 mg (1.10 mmol) of 5,5'-bis(trimethylstannyl)-2,2'-bithiophene, 531 mg (1.00 mmol) of N-2-ethylhexyl-2,7-diiodocarbazole and 25 μg of Cl$_2$(PPh$_3$)$_2$Pd(0) were dissolved in 30 mL of degassed THF. The solution was refluxed under argon for 3 days. The whole mixture was then poured into cold methanol (300 mL). The precipitated material was recovered by filtration through a Büchner funnel and washed with dilute HCl. The solid material was washed for 24 h in a Soxhlet apparatus using acetone to remove oligomers and catalyst residues. The resulting polymers were soluble in THF and CHCl$_3$. (Yield: 52%).

Example 9

Preparation of poly (N-octyl-2,7-carbazole-alt-2,5-thiophene) (PTC)

In a 25 mL flask was added 350 mg (0.66 mmol) of compound (3), 276 mg (0.67 mmol) of compound (8), 9 mg (13 μmol, Aldrich Co.) of PdCl$_2$(PPh$_3$)$_2$ and 8 mL of anhydrous THF. The mixture was refluxed under argon for 72 h. The yellow suspension was poured in cold methanol. The precipitate was collected by flitration and washed with acetone in a Soxhlet apparatus for 48 h. After being dried under reduced pressure, an orange solid was obtained. (Yield: 68%).

Example 10

Preparation of poly (N-octyl-2,7-carbazole-alt-2,5-dioxyethylenethiophene) (PEDOTC)

In a 10 mL flask was added 190 mg (0.36 mmol) of compound (14), 107 mg (0.36 mmol) of compound (7), 8 mg (7 μmol) of Pd(PPh$_3$)$_4$, 3 mL of anhydrous THF and 2 mL of K$_2$CO$_3$ 2M in water. The mixture was refluxed under argon for 72 h. The black suspension was poured in cold methanol. The precipitate was collected by filtration and washed with acetone in a Soxhlet apparatus for 48 h. After being dried under reduced pressure, a black solid was obtained. (Yield: 68%).

Example 11

Preparation of poly (N-(2-ethylhexyl)-2,7-carbazole-alt-4-butyl-N,N-Bis(p-phenyl)phenylamine) (PPAC)

In a 10 mL flask, 501 mg (0.87 mmol) of N-(2-ethylhexyl)-2,7-bis(trifluoromethanesulfonyl)carbazole, 474 mg (0.87 mmol) of 4-butyl-N,N-Bis(p-(4,4,5,5-tetramethyl-1,3,2-dioxaborolan-2-yl)phenyl)phenylamine) and 10 mg of (PPh$_3$)$_4$Pd(0) were dissolved in a degassed mixture of THF (3 mL) and aqueous 2 M K$_2$CO$_3$ (2 mL). The solution was refluxed under argon for 3 days. The whole mixture was then poured into cold methanol (100 mL). The precipitated material was recovered by filtration through a Büchner funnel and washed with dilute HCl. The solid material was washed for 24 h in a Soxhlet apparatus using acetone to remove oligomers and catalyst residues. The resulting polymers were soluble in THF and CHCl$_3$. (Yield: 75%).

Example 12

Preparation of poly (N-octyl-2,7-carbazole)

In a 10 mL flask, 500 mg (0.87 mmol) of compound 15, 137 mg (0.52 mmol) of triphenylphosphine, 188 mg (2.88 mmol) of zinc powder 99.998% 100 mesh, 7.0 mg (0.09 mmol) of 2,2'-bipyridine 12.0 mg (0.04 mmol) of anhydrous nickel (II) chloride and 3 mL of anhydrous DMF were stirred under argon for 3 days at 100° C. The whole mixture was then poured into a cold mixture of methanol/HCl (5:1 v/v). The precipitated material was recovered by filtration through a Büchner funnel and washed with dilute HCl. The solid material was washed for 24 h in a Soxhlet apparatus using acetone to remove oligomers and catalyst residues. The resulting solid was dilute again in chloroform and filtrated on 0.2 μm filtering paper to remove all traces of nickel. The resulting solid was dried under reduced pressure for 24 h. (Yield: 83%).

Example 13

Preparation of poly (N-octyl-2,7-carbazole)

In a 10 mL flask, 540 mg (0.94 mmol) of compound 15, 500 mg (0.94 mmol) of compound 16 and 10 mg of $(PPh_3)_4Pd(0)$ were dissolved in a degassed mixture of THF (6.6 mL) and aqueous 2 M $K_2CO_3$ (2.8 mL). The solution was refluxed under argon for 3 days. The whole mixture was then poured into cold methanol (100 mL). The precipitated material was recovered by filtration through a Büchner funnel and washed with dilute HCl. The solid material was washed for 24 h in a Soxhlet apparatus using acetone to remove oligomers and catalyst residues. The resulting polymers were partially soluble in THF and $CHCl_3$. (Yield: 86%).

Figure 1:
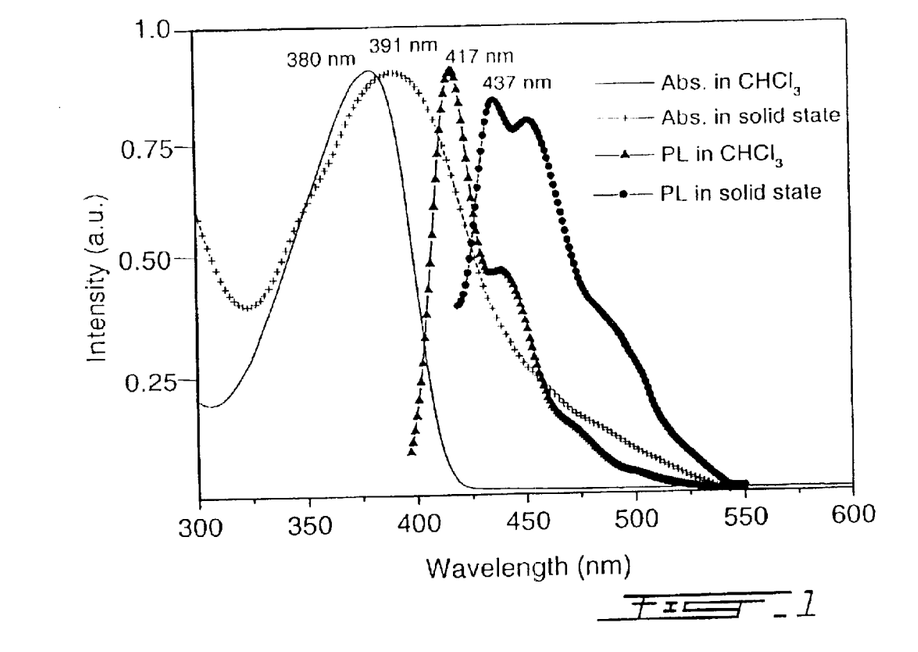
FIG. 1 is the absorption (Abs.) and emission (PL) spectrum of poly(N-octyl-2,7-carbazole) in chloroform and in the solid state.
Figure 2:
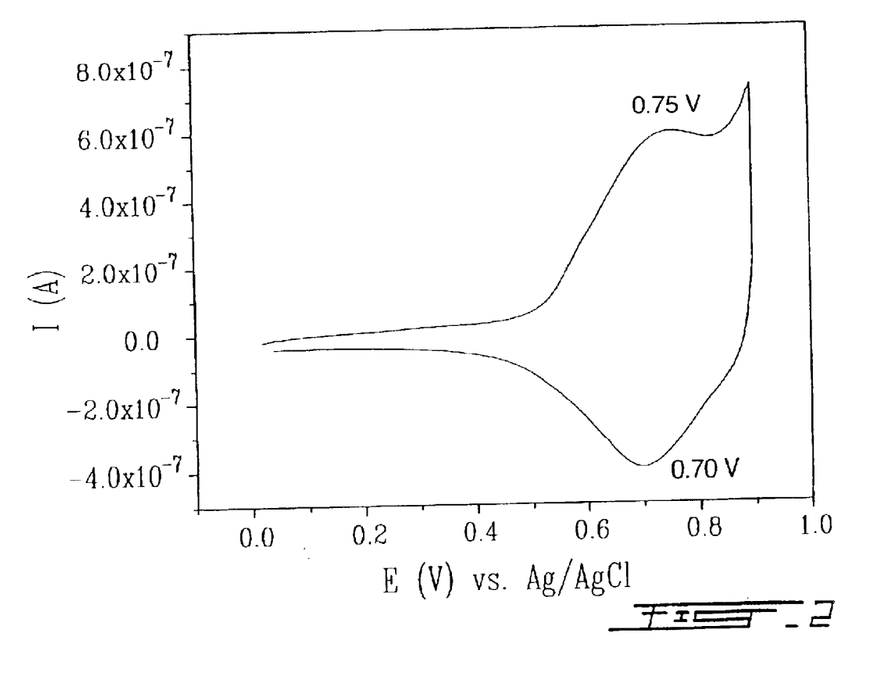
FIG. 2 is the cyclic voltammogram of poly(N-octyl-2,7-carbazole) cast on a platinum electrode, in acetonitrile containing 0.1M N-Bu$_4$NBF$_4$, at a scan rate of 10 mV/s.

The resulting conjugated homopolymers and copolymers are soluble in common organic solvents, such as chloroform and tetrahydrofuran. The number-average molecular weight (measured by size exclusion chromatography against monodisperse polystyrene standards) of these polymers is about 10 kDa with a polydispersity of 2. They can be processed by spin coating or by simple casting to yield thin polymer films with good mechanical properties. As reported in FIG. 1, the solution and solid-state optical properties of poly(N-octyl-2,7-carbazole) have been investigated in more details. In dilute solutions or as thin films, this polymer exhibits an absorption maximum around 380–390 nm, indicating a pale-yellow color in both forms. This absorption maximum is significantly red-shifted compared to that previously reported for poly(N-alkyl-3,6-carbazole)s (i.e. 300–320 nm) and can be related to a more conjugated structure. Moreover, poly(N-octyl-2,7-carbazole) exhibits an intense blue emission upon radiative excitation, with a quantum yield of about 80% in chloroform, at room temperature. In solution, poly(N-octyl-2,7-carbazole) shows a maximum of emission at 417 nm followed by two vibronic side-bands at 439 and 474 nm whereas in the solid state, the polymer is slightly more conjugated with an emission maximum at 437 nm followed by two other maxima at 453 and 492 nm. These solid-state and solution emission spectra are slightly red-shifted compared to poly(9,9-dioctyl-2,7-fluorene) and could be related to the electron-donating effect of the nitrogen atom in the inner ring. Moreover, poly(N-octyl-2,7-carbazole) shows a relatively low oxidation potential at 0.75 V vs Ag/AgCl (FIG. 2). This oxidation potential is lower that those reported for poly(N-alkyl-3,6-carbazole)s at 0.85 and 1.2 V vs Ag/AgCl and is an indirect proof of the more delocalized structure in 2,7-linked polycarbazoles.

Figure 3:
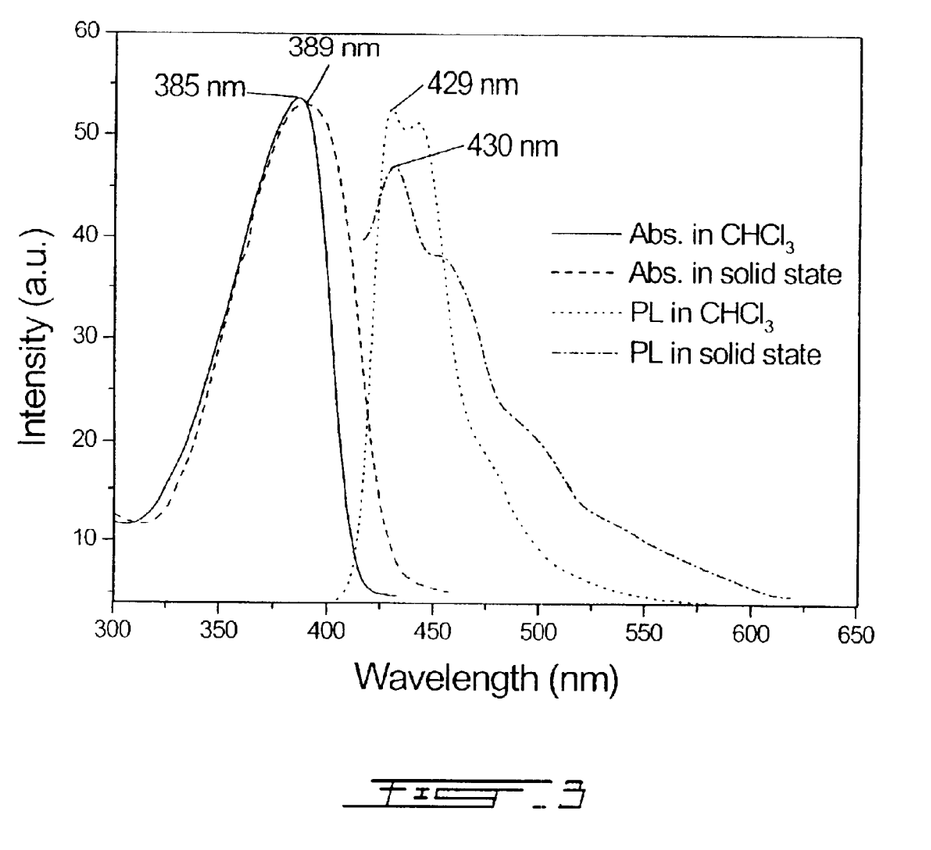
FIG. 3 is the absorption (Abs.) and emission (PL) spectrum of poly(N-(2-ethylhexyl)-2,7-carbazole-co-9,9-dioctyl-2,7-fluorene) in chloroform and in the solid state.

The solution and solid-state optical properties of the copolymer poly(N-(2-ethylhexyl)-2,7-carbazole-co-9,9-dioctyl-2,7-fluorene) have also been investigated, as reported in FIG. 3. For dilute solutions or thin films, the absorption maximum is a round 385–390 nm, indicating a pale-yellow color and this can be related, once again, to a more conjugated structure than that of poly(N-alkyl-3,6-carbazole)s. The copolymer exhibits an intense blue emission when excited with radiation at room temperature. In solution, poly(N-(2-ethylhexyl)-2,7-carbazole-co-9,9-dioctyl-2,7-fluoren shows a maximum of emission at 429 nm followed by two vibronic side-bands at 440 and 479 nm. The emission spectrum of the polymer in the solid phase has a maximum at 430 nm followed by two other maxima at 454 and 500 nm.

The combination of electrical and optical properties described above is particularly interesting for the development of a novel class of blue-light emitting materials. Moreover, with the possibilities of structural modifications through the synthesis of various alternating or random copolymers, it is possible to develop tunable light-emitting materials.

We claim:

1. A conjugated polymer comprising alternating units C formula (I'):

(I')

wherein R represents a linear or branched alkyl group having 1 to 22 carbon atoms.

2. A conjugated polymer comprising random units of formula (I'):

(I')

wherein R represents a linear or branched alkyl group having 1 to 22 carbon atoms.

3. A conjugated polymer selected from the group consisting of poly(N-octyl-2,7-carbazole-alt-9,9-dioctyl-2,7-fluorene), poly[N-2-ethylhexyl-2,7-carbazole-alt-5,5'-bithiophene)], poly(N-octyl-2,7-carbazole-alt-2,5-thiophene), poly(N-octyl-2,7-carbazole-alt-2,5- dioxyethylenethiophene), poly(N-(2-ethylhexyl)-2,7-carbazole-alt-4-butyl-N,N-bis(p-phenyl)phenylamine.

4. A process for preparing a conjugated poly(N-alkyl-2,7-carbazole) of formula (I):

wherein R represents a linear or branched alkyl group having 1 to 22 carbon atoms and n is an integer of about 3 to about 100, which comprises treating a N-alkyl-2,7-difunctionalized carbazole of formula (II):

wherein R is as defined above and X represents a trifluoromethanesulfonyl group or a halogen atom selected from the group consisting of bromine, chlorine and iodine atoms, with triphenylphosphine and 2,2'-bipyridine in the presence of zinc and nickel chloride, to cause polymerization of the compound of formula (II).

5. A process according to claim 3, wherein use is made of a compound of formula (II) in which R is an octyl group and X is an iodine atom or a trifluoromethanesulfonyl group.

6. The conjugated polymer of claim 3 wherein the polymer is poly(N-(2-ethylhexyl)-2,7-carbazole-co-99-dioctyl-2,7-fluorene.

* * * * *